(12) United States Patent
Mattila et al.

(10) Patent No.: US 8,427,508 B2
(45) Date of Patent: Apr. 23, 2013

(54) METHOD AND APPARATUS FOR AN AUGMENTED REALITY USER INTERFACE

(75) Inventors: Jouka Mikael Mattila, Tampere (FI); Hannu Olavi Nieminen, Lempäälä (FI)

(73) Assignee: Nokia Corporation, Espoo (FI)

( * ) Notice: Subject to any disclaimer, the term of this patent is extended or adjusted under 35 U.S.C. 154(b) by 929 days.

(21) Appl. No.: 12/491,719

(22) Filed: Jun. 25, 2009

(65) Prior Publication Data

US 2010/0328344 A1 Dec. 30, 2010

(51) Int. Cl.
*G09G 5/00* (2006.01)

(52) U.S. Cl.
USPC .......................................... 345/634

(58) Field of Classification Search ........................ None
See application file for complete search history.

(56) References Cited

U.S. PATENT DOCUMENTS

| | | | |
|---|---|---|---|
| 6,169,552 B1 | 1/2001 | Endo et al. | |
| 6,208,353 B1 * | 3/2001 | Ayer et al. | 345/634 |
| 6,215,498 B1 | 4/2001 | Filo et al. | |
| 6,272,431 B1 | 8/2001 | Zamojdo et al. | |
| 6,466,232 B1 | 10/2002 | Newell et al. | |
| 6,710,774 B1 | 3/2004 | Kawasaki et al. | |
| 6,868,336 B1 | 3/2005 | Nakano | |
| 7,228,869 B2 * | 6/2007 | Wilhelm | 137/514.3 |
| 2003/0006913 A1 | 1/2003 | Joyce et al. | |
| 2004/0209602 A1 | 10/2004 | Joyce et al. | |
| 2005/0107952 A1 * | 5/2005 | Hoshino et al. | 701/211 |
| 2007/0002078 A1 * | 1/2007 | He et al. | 345/633 |
| 2007/0162942 A1 | 7/2007 | Hamynen et al. | |
| 2008/0043040 A1 | 2/2008 | Benman | |
| 2008/0122785 A1 | 5/2008 | Harmon | |
| 2008/0126992 A1 | 5/2008 | Scheu et al. | |
| 2008/0166115 A1 | 7/2008 | Sachs et al. | |
| 2008/0192048 A1 | 8/2008 | Nabais | |
| 2008/0216009 A1 | 9/2008 | Drallos | |
| 2008/0252527 A1 | 10/2008 | Garcia | |
| 2008/0268876 A1 | 10/2008 | Gelfund et al. | |
| 2008/0314147 A1 | 12/2008 | Nasiri et al. | |
| 2009/0005975 A1 | 1/2009 | Forstall et al. | |

(Continued)

FOREIGN PATENT DOCUMENTS

| | | |
|---|---|---|
| CA | 2379611 A1 | 1/2003 |
| CN | 101801837 A | 8/2010 |

(Continued)

OTHER PUBLICATIONS

German, "Nokia's Point & Find gives new life to the camera phone", Apr. 2, 2009, CTIA, pp. 1-6, http://reviews.cnet.com/8301-12261_7-10210256-51.html.

(Continued)

*Primary Examiner* — Ryan R Yang
(74) *Attorney, Agent, or Firm* — Ditthavong Mori & Steiner, P.C.

(57) ABSTRACT

An approach is provided for an augmented reality user interface. An image representing a physical environment is received. Data relating to a horizon within the physical environment is retrieved. A section of the image to overlay location information based on the horizon data is determined. Presenting of the location information within the determined section to a user equipment is initiated.

20 Claims, 9 Drawing Sheets

U.S. PATENT DOCUMENTS

| | | |
|---|---|---|
| 2009/0007661 A1 | 1/2009 | Nasiri et al. |
| 2009/0063983 A1 | 3/2009 | Amidon et al. |
| 2009/0077463 A1 | 3/2009 | Koster |
| 2009/0145225 A1 | 6/2009 | Nasiri et al. |
| 2009/0171581 A1 | 7/2009 | Ushida et al. |
| 2009/0184849 A1 | 7/2009 | Nasiri et al. |
| 2009/0240431 A1 | 9/2009 | Chau et al. |
| 2009/0262074 A1 | 10/2009 | Nasiri et al. |
| 2009/0265671 A1 | 10/2009 | Sachs et al. |
| 2009/0303204 A1 | 12/2009 | Nasiri et al. |
| 2009/0307611 A1 | 12/2009 | Riley |
| 2010/0061701 A1 | 3/2010 | Iwane |
| 2010/0064805 A1 | 3/2010 | Seeger et al. |
| 2010/0071467 A1 | 3/2010 | Nasiri et al. |
| 2010/0214216 A1 | 8/2010 | Nasiri et al. |
| 2010/0215250 A1 | 8/2010 | Zhu |

FOREIGN PATENT DOCUMENTS

| | | |
|---|---|---|
| CN | 101911048 A | 12/2010 |
| DE | 60211601 T2 | 5/2007 |
| EP | 1274264 A1 | 1/2003 |
| EP | 2167419 A2 | 3/2010 |
| EP | 2195780 A1 | 6/2010 |
| EP | 2255297 A1 | 12/2010 |
| EP | 2297649 A1 | 3/2011 |
| JP | 2003-047034 A | 2/2003 |
| JP | 2011-503522 A | 1/2011 |
| WO | 2005/121707 A2 | 12/2005 |
| WO | WO 2009/0009803 A2 | 1/2009 |
| WO | WO 2009/029559 A1 | 3/2009 |
| WO | WO 2009/039080 A1 | 3/2009 |
| WO | WO 2009/091873 A1 | 7/2009 |
| WO | WO 2009/152074 A1 | 12/2009 |
| WO | WO 2010/030951 A1 | 3/2010 |
| WO | WO 2010/045498 A1 | 4/2010 |
| WO | WO 2010/056548 A1 | 5/2010 |

OTHER PUBLICATIONS

International Search Report for related International Patent Appliaction No. PCT/FI2010/050960 dated May 9, 2011, pp. 1-7.

International Written Opinion for related Patent Application No. PCT/IF2010/050960 dated May 9, 2011, pp. 1-11.

Nurminen, "Mobile 3D City Maps", Helsinki Institute for Information Technology HIIT, Mobile Graphics, IEEE, Computer Graphics and Application, Jul./Aug. 2008, pp. 22-31.

Nurminen, "Mobile Three-dimensional City Maps", TKK Dissertations in Media Technology, Espoo, Finland, Dec. 10, 2009.

PHP Classes, First Person View, Browse Images Like a First Person View Game, http://www.phpclasses.org/package/6460-PHP-Browse-images-like-a-first-person-view. . . , May 5, 2011.

PHP Classes, Top3 Best Rated Classes of Games group, http://www.phpclasses.org/browse/calss/30.html, May 5, 2011.

Reponen, et al., "World-Wide Access to Geospatial Data by Pointing through the Earth", Apr. 14-15, 2010, Atlanta, GA, U.S.A., pp. 3895-3900, CHI 2010: Work-in-progress (Spotlight on Posters Day 3 & 4).

Vesa, "Mobile Three-dimensional City Maps", TKK Dissertations in Media Technology, pp. 1-48, ISBN: 978-952-248-193-1 (online).

Laakso, K., Gjesdal, O., Sulebak, J.: Tourist Information and Navigation Support by Using 3D Maps Displayed on Mobile Devices. Workshop "HCI in Mobile Guides" 2003, Udine, Italy, 1-6 (2003).

Image Geo-Mashups: The Example of an Augmented Reality Weather Camera, Gliet et al., AVI'08, May 28-30, 2008, Napoli, Italy, pp. 1-8.

International search report and written opinion for corresponding international application No. PCT/FI2010/050494 dated Dec. 8, 2010, pp. 1-15.

Final Rejection for related U.S. Appl. No. 12/636,262 dated Jul. 20, 2012, pp. 1-49.

* cited by examiner

540

560

METHOD AND APPARATUS FOR AN AUGMENTED REALITY USER INTERFACE

BACKGROUND

Service providers and device manufacturers are continually challenged to deliver value and convenience to consumers by, for example, providing compelling network and application services. These services can include location and navigation services on the device. However, often user interfaces lack providing adequate information on a screen or usability for a user.

SOME EXAMPLE EMBODIMENTS

According to one embodiment, a method comprises receiving an image representing a physical environment. The method also comprises retrieving data relating to a horizon within the physical environment. The method further comprises determining a section of the image to overlay location information based on the horizon data. The method additionally comprises initiating presenting the location information within the determined section to a user equipment.

According to another embodiment, an apparatus comprising at least one processor, and at least one memory including computer program code, the at least one memory and the computer program code configured to, with the at least one processor, cause the apparatus to receive an image representing a physical environment. The apparatus is also caused to retrieve data relating to a horizon within the physical environment. The apparatus is further caused to determine a section of the image to overlay location information based on the horizon data. The apparatus is additionally caused to initiate presenting the location information within the determined section to a user equipment.

According to another embodiment, a computer-readable storage medium carrying one or more sequences of one or more instructions which, when executed by one or more processors, cause an apparatus to receive an image representing a physical environment. The apparatus is also caused to retrieve data relating to a horizon within the physical environment. The apparatus is further caused to determine a section of the image to overlay location information based on the horizon data. The apparatus is additionally caused to initiate presenting the location information within the determined section to a user equipment.

According to another embodiment, an apparatus comprises means for receiving an image representing a physical environment. The apparatus also comprises means for retrieving data relating to a horizon within the physical environment. The apparatus further comprises means for determining a section of the image to overlay location information based on the horizon data. The apparatus additionally comprises means for initiating presenting the location information within the determined section to a user equipment.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method, an apparatus, and software for displaying an augmented reality graphic user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
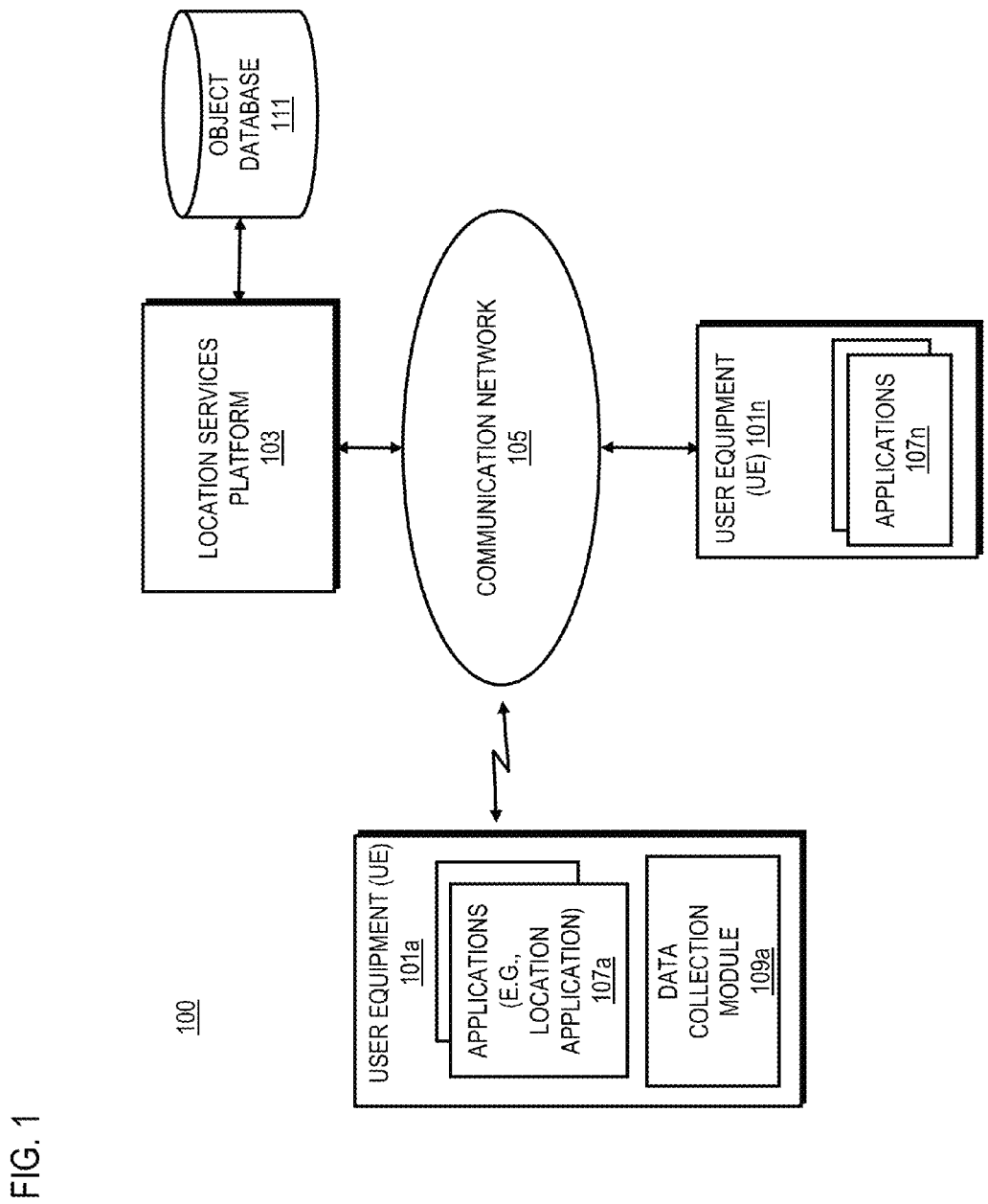
FIG. 1 is a diagram of a system including a user equipment capable of displaying an augmented reality user interface, according to one embodiment.

FIG. 1 is a diagram of a system including a user equipment capable of displaying an augmented reality user interface, according to one embodiment. Location-based services such as navigation and mapping applications are used on mobile devices. When creating contextual applications, much content is overlaid on maps, thus making map representations cluttered. Additionally, it is not always easy for a user to link the user's current location to the graphical representation of a map on a user equipment. Navigational tasks, in a real life physical environment, can have blocking objects in the field of view between the user and a destination location. In some cases, the object is a building or tree that the user cannot see though, thus it is difficult to determine if the destination is behind the building. Additionally, it is difficult to determine the destination's relation to the user from a different location on a map user interface (e.g., the destination, a third party location, etc.).

To address this problem, a system 100 of FIG. 1 introduces the capability to display an augmented reality user interface. In one embodiment, the augmented reality user interface can be used to display content to a user by displaying a current location view in one area of a user equipment (UE) 101 screen and an augmented view in a second area of the screen. In this embodiment, the second area can represent an area of the screen representing the sky. The user interface uses the space available in the air to show virtual objects. In one embodiment, virtual objects can be satellite images, maps, points of interest, information about people and locations of people, or any other data that has a linkage to a physical location.

In another embodiment, the data is projected to a virtual dome. A virtual dome can be described as a reflection of the world from the point of view of the UE 101. The dome can have various radii and changing the radius can zoom in and out of the displayed image. Additionally, a user can zoom into a segment of the user interface. The displayed user interface content can include be rendered as curved or planar.

Under the scenario of FIG. 1, a system 100 involves UE 101a-101n having connectivity to a location services platform 103 via a communication network 105. The UE 101 can utilize a location application 107 that utilizes data collected by a data collection module 109 to provide location-based services. In one embodiment, the location-based services include navigation, maps, or point of interest services. The location application 109 can utilize the location services platform 103 to retrieve information stored in an object database 111. The object database 111 can include information regarding the surrounding area of the UE 101. Objects from the object database 111 can be used to populate the virtual objects. A copy of objects in the object database 111 can be cached in a memory of the UE 101.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), head-up display (HUD), augmented reality glasses, projectors, or any combination thereof. It is also contemplated that the UE 101 can support any type of interface to the user (such as "wearable" circuitry, head-mounted circuitry, near-eye displays, etc.).

As shown in FIG. 1, the system 100 comprises a UE 101 having connectivity to a location services platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

In one embodiment, the system 100 includes a location services platform 103. In this embodiment, the location services platform 103 can receive location data and sensor data from a location application 107 associated with a UE 101 to help determine natural and man-made structures nearby the UE 101. Utilizing the location and orientation data from a UE 101, the location services platform 103 can query an object database 111 for structural information. The object database 111 can contain information about structures located on a map. In one embodiment, the structures are stored using simple objects (e.g., using dimensions of a house or tower). Corresponding objects representing structure objects can also be stored. The corresponding objects can be generic objects that represent structures in the real world (e.g., a generic ranch-style house instead of a picture image). The object information can be collected from various databases as well as processing images using location stamps. In one embodiment, a user utilizing a UE 101 location application 107 begins an augmented user interface. The location application determines the location and orientation of the UE 101 and sends the information to the location services platform 103. The location services platform 103 queries the object database 111 to determine the structures in the area surrounding the UE 101. The location services platform 103 then initiates a transmission to the UE 101 with the structure information. In one embodiment the location services platform 103 additionally transmits object data (e.g., generic geometric structures). In another embodiment, the UE 101 can store or render the generic structures based on the structure information.

By way of example, the UE 101 and the location services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
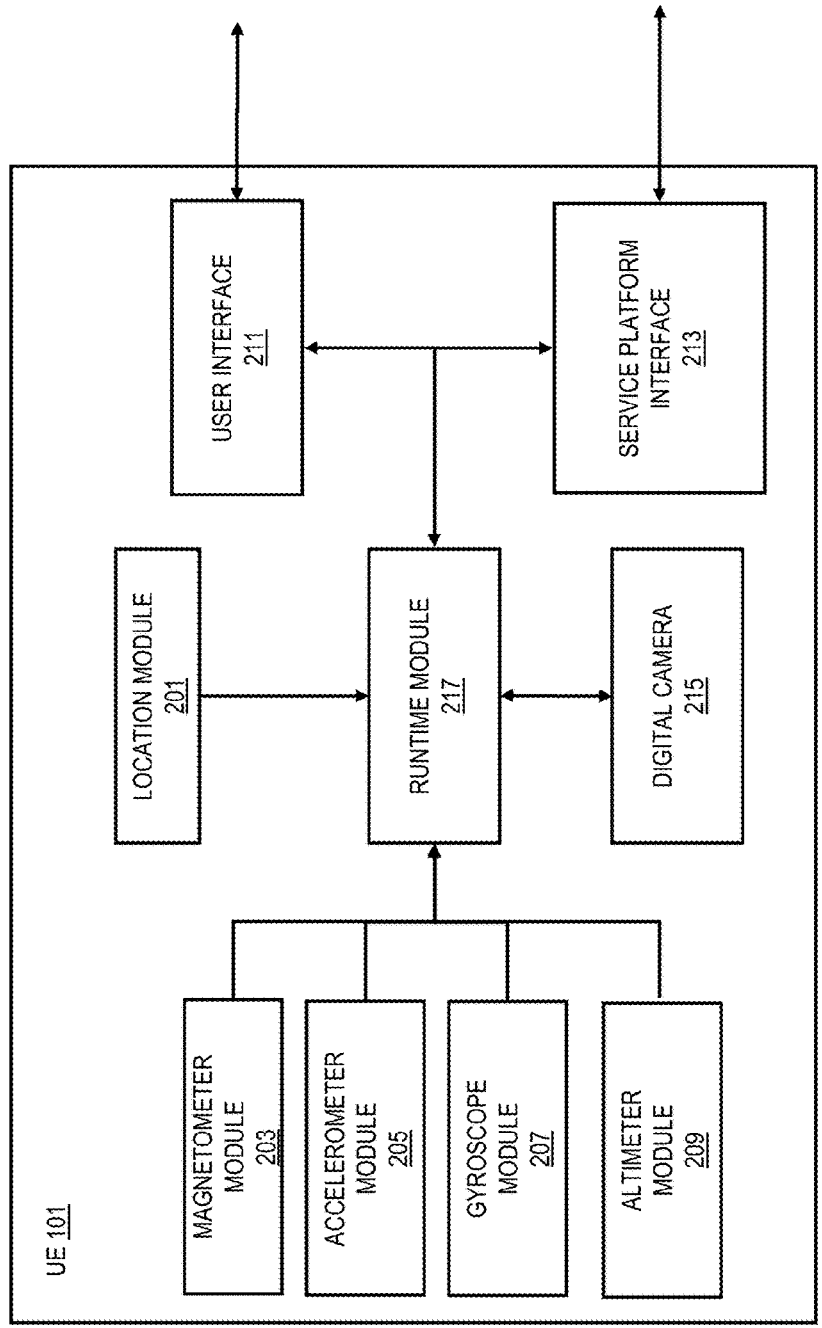
FIG. 2 is a diagram of the components of a user equipment, according to one embodiment.

FIG. 2 is a diagram of the components of a user equipment, according to one embodiment. By way of example, the UE 101 includes one or more components for discovering important locations. It is contemplated that the functions of these components may be combined in one or more components or performed by other components of equivalent functionality. In this embodiment, the UE 101 includes a location module 201, a magnetometer module 203, an accelerometer module 205, a gyroscope module 207, an altimeter module 209, a user interface 211, a service platform interface 213, a digital camera 215, and a runtime module 217.

In one embodiment, a UE 101 includes a location module 201. This location module 201 can determine a user's location. The user's location can be determined by a triangulation system such as GPS, A-GPS, Cell of Origin, or other location extrapolation technologies. Standard GPS and A-GPS systems can use satellites to pinpoint the location of a UE 101. In some embodiments, the GPS system can determine an altitude of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. In some embodiments, wireless local area networks can be used to determine location. In another embodiment, the physical environment can be tagged with location information that can be received by the UE 101.

In one embodiment, a UE 101 includes a magnetometer module 203. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is used to control a display.

In one embodiment, a UE 101 includes an accelerometer module 205. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module can determine the angle the UE 101 is pointed as compared to Earth's gravity. In one embodiment, vertical directional data obtained from an accelerometer is used to control a display.

In one embodiment, a UE 101 includes a gyroscope module 207. A gyroscope is a device for measuring orientation. The gyroscope can be used to sense or measure pitch, roll, and yaw angles based on angular momentum principles. From a starting point, pitch, roll, and yaw angles can be used to measure the orientation of the UE 101. Again, the front of a media capture device can be marked as a reference point in determining orientation. Gyroscope information, in addition to accelerometer information and magnetometer information, can be used to determine the orientation of a UE 101 without any other calibration requirements. Additionally, this combination of information can be used to determine the change in height of a UE 101 after a starting point.

In one embodiment, a UE 101 includes an altimeter module 209. An altimeter is a device for measuring altitude. In one embodiment, a barometric altimeter is used to measure the altitude of the UE 101 as a measurement of altitude in comparison to sea level based on atmospheric pressure. In another embodiment, a radar altimeter measures height above ground level based on the time of a radio signal to reflect from the ground back to the UE 101.

In one embodiment, a UE 101 includes a service platform interface 213. The service platform interface 213 is used by the runtime module 217 to communicate with a location services platform 103. In some embodiments, the service platform interface 213 is used to send and receive object information to the location services platform 103.

In one embodiment, a UE 101 includes a user interface 211. The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, etc. A user can input service requests to the UE 101 via the user interface 211.

In some embodiments, a UE 101 includes a digital camera 215. Images can be captured or streamed using the digital camera 215 in the form of an image. The digital camera can also utilize a zoom function. If the zoom function is used, the digital camera 215 can embed the image with metadata regarding the zoom lens. A runtime module 217 can process the image or a stream of images to send content to the platform 103 via a world platform interface 213.

Figure 3:
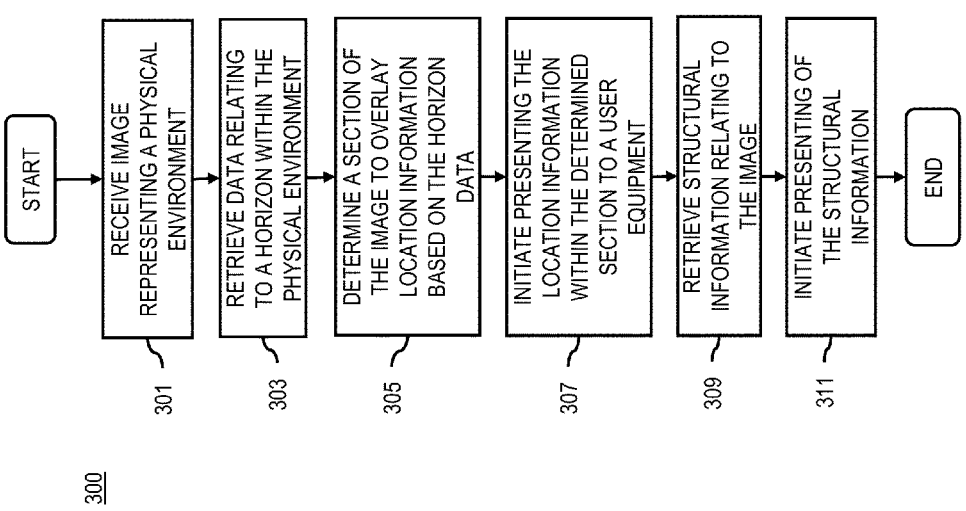
FIG. 3 is a flowchart of a process for displaying an augmented reality graphic user interface, according to one embodiment.

FIG. 3 is a flowchart of a process for displaying an augmented reality graphic user interface, according to one embodiment. In one embodiment, the runtime module 217 or a location services platform 103 performs the process 300 and is implemented in, for instance, a chip set including a processor and a memory as shown FIG. 7. A runtime module 217 receives a request to use a location application 107. The runtime module 217 begins execution of the location application 107.

In step 301, the runtime module 217 or location services platform 103 receives an image representing a physical environment. The physical environment can be an area surrounding a UE 101. The runtime module 217 can receive the image from an image capture device (e.g., a digital camera, a camcorder, etc.). The UE 101 can be used to view objects in the sky (e.g., a map that represents a virtual reflection of a surrounding area). The image can also be used to determine data regarding a physical environment.

At step 303, the runtime module 217 or location services platform 103 retrieves data relating to a horizon within the physical environment. According to certain embodiments, horizon data can refer to any information relating to distinguishing objects of the physical environment from areas, such as a horizon, within the image for overlaying supplemental information. The horizon data can be determined using various sensor data and/or an analysis of the image. Thus, horizon data can include information regarding the turning angle of a UE 101. In one embodiment data is retrieved from an accelerometer sensor, a compass sensor (e.g., a magnetometer), a gyroscope, an altimeter, an image sensor, a location module or a combination thereof. In one embodiment, compass data can be used to calculate the direction of the UE 101 as compared to a fixed location (e.g., north pole). In another embodiment, accelerometer data is used to determine the angle of the UE 101 as compared to the ground by comparing the acceleration of gravity to a fixed point on the UE 101. In yet another embodiment, gyroscope data can be used to determine the orientation of the UE 101 by measuring the turning of the UE 101. In addition, altimeter data can be used to determine the height of the UE 101.

At step 305, the horizon data is used to determine a section of the image to overlay location information. In one embodiment, the horizon can be determined by processing the sensor data. The horizon can be used as a way to choose the section (e.g., an area representing the sky). The sensor data (e.g., three-axis accelerometer data) can determine the angle of the front of the UE 101 from the ground. Other sensor data (e.g., a pressure altimeter) can be used to determine the height of the UE 101 from sea level. Additionally, an altimeter can be used to determine the height of the UE 101 from the ground. This data can be correlated to determine a horizon corresponding to sea level. In another embodiment, the gyroscope data can be used to determine quick head rotations. In yet another embodiment, the image can be processed (e.g., using color sensing schemes, light sensing schemes, etc.) to determine the sky areas from the ground and structures. In a further embodiment, a virtual world corresponding to the physical environment can be created to store structure and object information. The horizon can be created using structure and other object information contained in the virtual world. The virtual world data can be correlated to the image using location information (e.g. GPS coordinates) and orientation information (e.g., angle in respect to ground, direction facing in relation to the north pole, etc.). A virtual horizon line can then be created at the top of the structures and separating the sky from the ground. In another embodiment, areas of the structures are cut off for additional viewing area. In this embodiment, the virtual horizon line is across the UE 101 screen without regard for structural elements. In other embodiments, sensor data can be used to determine types of movement (e.g., running, jumping, riding in a car, etc.) of the UE 101 because each movement can correspond to specific periodic accelerations. These movements can be determined by creating movement profiles and comparing the current movements to movement profiles. Thus, each movement can be compensated for when determining the horizon.

At step 307, the runtime module 217 or location services platform 103 initiates presenting the location information within the determined section to a user equipment 101. In one embodiment, the runtime module 217 determines the section to overlay the location information and then displays the overlay. In another embodiment, the location services platform 103 determines the section and the content and initiates transmission of the location data over a network to the UE 101. In one embodiment, the location information includes a map. The map can represent a virtual reflection of an area surrounding the physical environment. The reflection area can be controlled using movement and zoom features. In another embodiment, the location information includes an icon representing a point of interest. In this embodiment, the point of interest can be a location on the other side of visible buildings. The icon can also have additional information (e.g., arrows indicating movement of the point of interest, a virtual beam of light to point to the ground location of the point of interest, people's interest towards the point of interest, etc.).

At step 309, the runtime module 217 or location services platform 103 retrieves structural information relating to the image. Structural information can be retrieved from an object database 111 using the location and orientation of the UE 101 as inputs or by processing the image. The structural information can be used to determine the section of the image to overlay location information. Additionally, the structural information can be used to determine and overlay virtual objects over another section of the image. This overlay can be of structural objects and other objects (e.g., buildings, cars, etc.) over the structures in the image. In this embodiment, the horizon can be represented by the top of the virtual structures. In other embodiments, the horizon can have a buffer area (e.g., a horizon line or other buffer). At step 311, the runtime module 217 or location services platform 103 initiates presentation of the structural information on a display of the UE 101.

With the above approach, user can more easily understand a surrounding physical environment (e.g., a city, suburban area, etc.) of the user. In this manner, tilting and raising a user equipment 101 can be a natural way to interact with a virtual environment to receive information about the surrounding physical environment. For example, a user can view a virtual map of an area surrounding the physical environment as a reflection in the sky. In this manner, the area in the sky is a reflection of locations in the physical environment.

Figure 4:
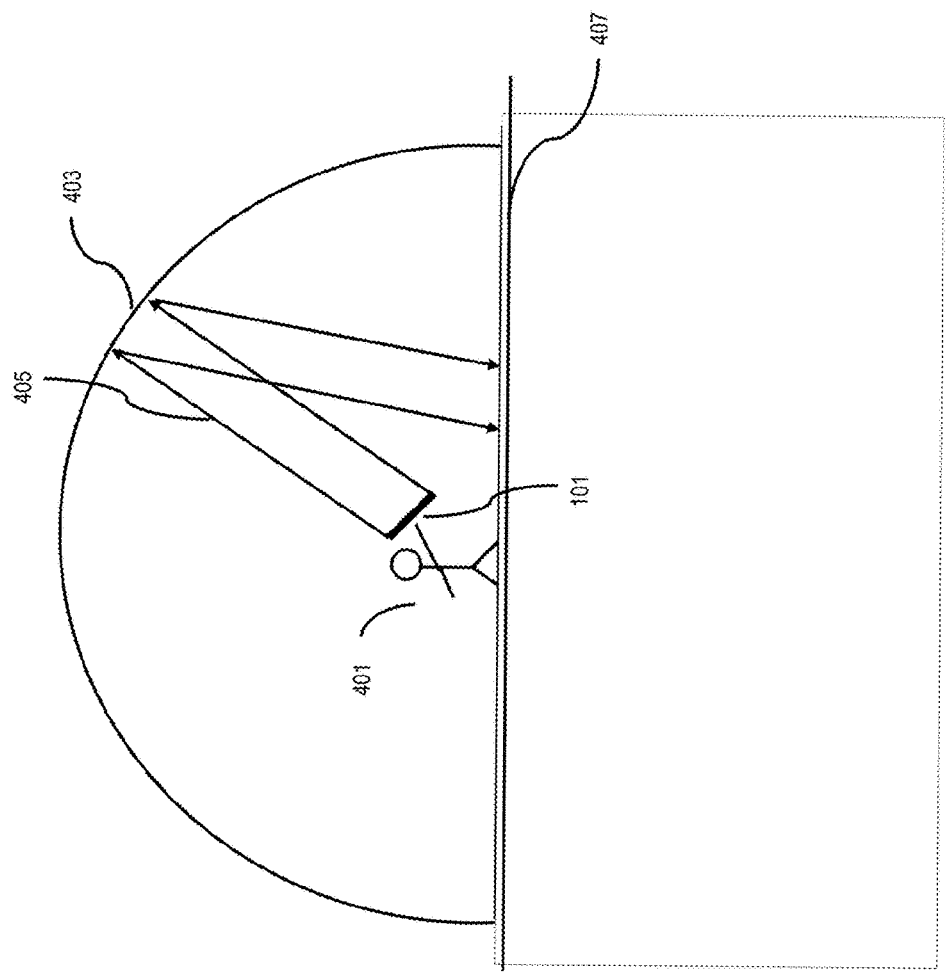
FIG. 4 is a diagram depicting a use of a user equipment, according to one embodiment.

FIG. 4 is a diagram depicting a use of a user equipment 101, according to one embodiment. In this embodiment, a user 401 is utilizing a UE 101 to display an augmented reality user interface. The user can view a display on the UE 101 using a user interface 211. Any suitable gear (e.g., a mobile device, augment reality glasses, projectors, a HUD, etc.) can be used as the user interface 211. The user interface 211 uses the space available in the air to show virtual objects. Virtual objects can be e.g., satellite images, maps, points of interest, information about people and their locations, or any other data that has a link to a physical location. Maps can be in multiple views (e.g., a reflection view, a top-down view, etc.) and can include street maps, terrain maps, and the like. Data can be projected on the user interface in relation to a virtual dome 403. The virtual dome 403 can be viewed as a reflective circular glass dome on top of a circular area. By looking from where the user 401 is located up towards the sky, the user can see a reflection of the surrounding area in place of the sky. In one embodiment, the sky is separated by a horizon line. In another embodiment, the horizon line can be represented by a virtual line across structures. In one embodiment, the user 401 can zoom into any area of the reflection to see a detailed picture of an area 407. Additionally, a user can be displayed augmented reality content overlaid on the reflective image. The size of the virtual dome 403 can be controlled by changing the size of the radius 405 of the virtual dome 403. In one embodiment, this action can be controlled by moving the UE 101 towards and away from the user 401. In one embodiment, the data projected on the virtual dome 403 is rendered to the user 401 via an application 107 (e.g., a mobile camera application). The user's position individualizes the map to the user 401. The virtual dome 403 surface can be viewed as curved or planar, and can be at different heights depending on the radius 405.

FIGS. 5A-5D are diagrams of user interfaces utilized in the processes of FIG. 3, according to various embodiments. A user interface 500 displays an augmented reality representation (e.g., a virtual dome representation) of a map 501 of the surrounding area of a user. In some embodiments, the map 501 or other virtual objects can be used as a platform for sharing, communication, and collaboration. The virtual dome representation can be considered a part of an augmented reality user interface. In one embodiment, the virtual dome user interface 500 is sensitive to a tilting angle and a height from the ground to where the device is held. Thus, as the user interface 500 is moved up and down and tilted, the display covers different areas associated with the movement. In one embodiment, the display trails a movement of the user interface 500 corresponding with a reflective dome. In another embodiment, the sensitivity of the motions can be changed to accommodate for precision. The user interface 500 also displays objects 503 streamed from a camera intermixed with the virtual dome. The object data can be stored in an object database 111 or a local cache on a UE 101. The objects in the object database 111 can correspond to location and orientation data provided by the UE 101. The object database can store the coordinates of the location of the object as well as the dimensions of the object. Additionally, these objects can be fitted into the image by using image processing techniques. These objects 503 can be buildings, natural structures, man-made structures, people, etc. In one embodiment, the tops of the structures 503, 505, 507 can be used to indicate a horizon. Thus, a space can be determined to be the sky. The sky area can represent an area of the user interface 500 image to overlay location information. In one embodiment, the location information can be a map 509. In one embodiment, the overlay map 509 is curved to a dome-like shape. In another embodiment, the overlay map 509 is planar.

Figure 5A:
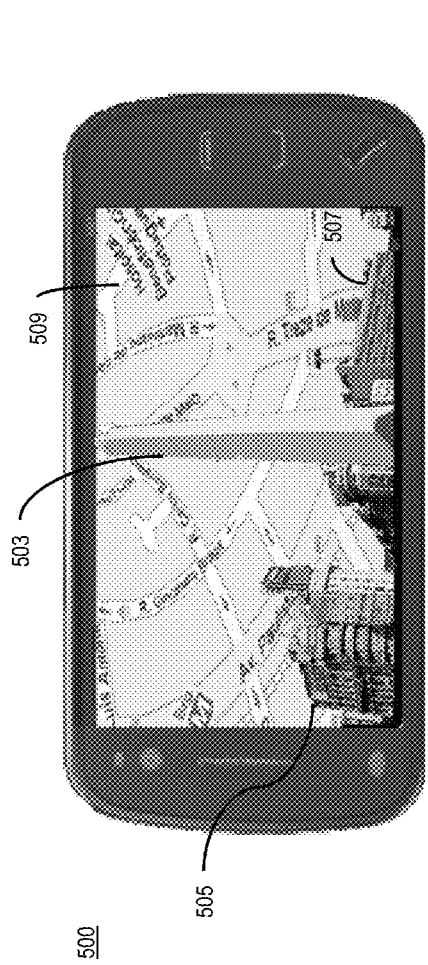
FIGS. 5A-5D are diagrams of user interfaces utilized in the processes of FIG. 3, according to various embodiments.
Figure 5B:
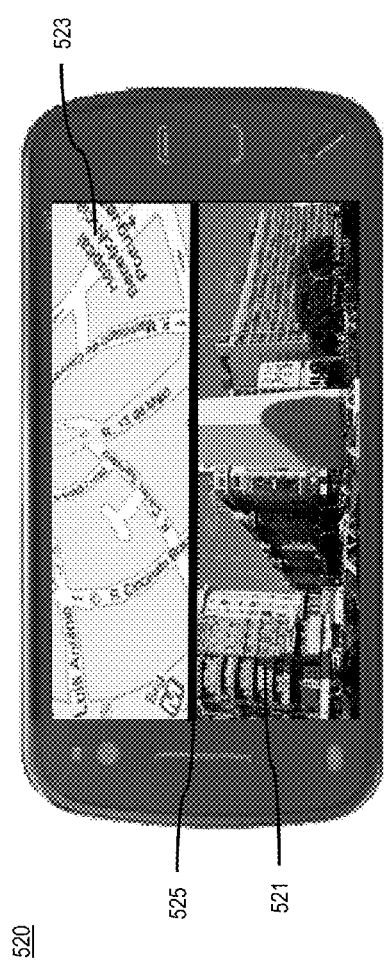
Figure 5C:
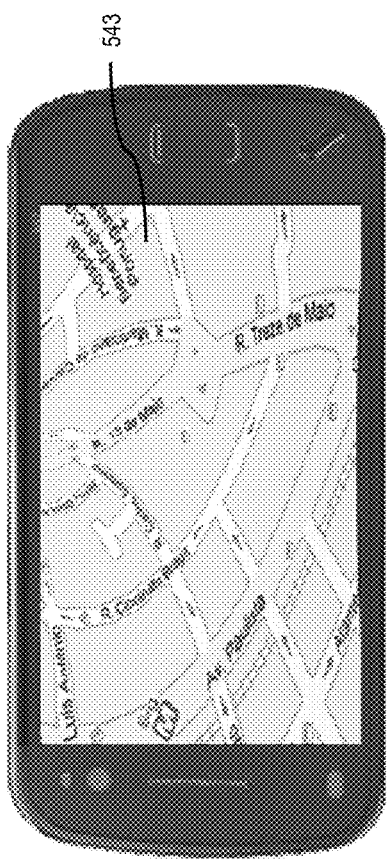

FIG. 5B is a diagram of a user interface 520 utilized in the processes of FIG. 3, according to one embodiment. In this diagram, an image area 521 is separated from a section 523 of the image to overlay information based on a horizon line 525. As a user points a UE 101 up towards the sky, more of the overlay section 523 is displayed. As a user points down towards the ground, the UE 101 displays less of the overlay section 523 is displayed and more of the image area 521 is displayed. Horizon preferences can be changed by the user so that the horizon can begin at different angles and heights from the ground (e.g., parallel to ground, 5 feet above the ground, etc.). In particular, the rotational angle of the UE 101 from the ground can be used as a preference because it can determine the angle the user is looking. Thus, a horizon line 525 can be at the apparent intersection of the earth and the sky from different views or using an average horizon. In one embodiment, the UE 101 displays a mapping application. The overlay section 523 becomes visible when the device is raised. The user continues to see the real surroundings of the physical environment through the lower part of the screen corresponding to the area below the horizon. In some embodiments, the horizon line is hidden behind tall buildings. The UE 101 can use its position sensors to detect a horizon from ground angles, heights, location, and orientation. Additionally, the UE 101 can be tilted and zoomed to view different parts of the surrounding physical environment. User interface 540 of FIG. 5C shows an embodiment where the user looks up so the horizon area is no longer in sight. In this embodiment, only the overlay section 543 is displayed. In this embodiment, the overlay section 543 displays a map. In other embodiments, the overlay section displays other virtual objects associated with the user's location, points of interest, or the like. Additionally, the user can look down so that the overlay section 543 is not displayed.

Figure 5D:
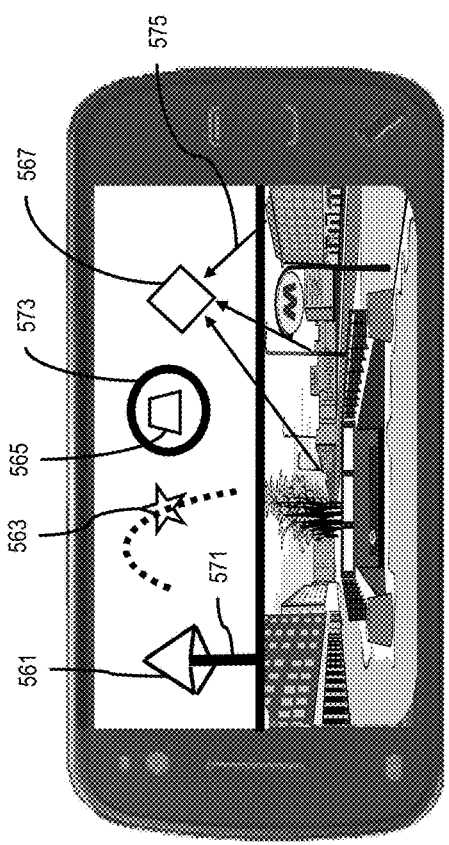

FIG. 5D is a diagram of a user interface 560 utilized in the processes of FIG. 3, according to one embodiment. In this diagram, the virtual objects 561, 563, 565, 567 are displayed in an overlay section 569 of the user interface 560. In one embodiment, the virtual objects 561, 563, 565, 567 can be selected by the user. The overlay section 569 can be a section of the user interface 560 that is above a horizon. In some embodiments, a map is displayed in the overlay section 569 along with the other virtual objects 561, 563, 565, 567. In this embodiment, the virtual objects 561, 563, 565, 567 in the overlay section 569 can be linked with objects in the physical environment. In one embodiment, a beam 571 links a pyramid object 561 to a physical object (not shown). The pyramid object 561 and the beam 571 can be clicked on by a user to begin actions. For example, the pyramid object 561 can represent a music store. Clicking on the icon can start downloading music from the store and the beam 571 can start pulsating during the download. In this manner, service providers can provide content. The beam 571 can also show the level of activity of the physical object (not shown), for example, how many people are currently visiting a concert hall and how loud the music is playing in the hall. In some embodiments, the beam 571 can point to locations inside of structures, e.g., the first floor of a building. In another embodiment, a star icon 563 can be shown to move in or orbit an area. The star icon 563 can be associated with the moving target (e.g., a public radio giveaway van) by using a moving line 577. In one embodiment, a trapezoid icon 565 can be glowing or have a halo 573. In this embodiment, the glowing halo 573 can represent a linked service or status corresponding to a real world object (e.g., the current wait to be seated at a restaurant). In another embodiment, a diamond icon 567 can be used to show how many people associated with the user (e.g., friends) surrounding the physical environment have interest towards an event (e.g., a festival associated with the diamond icon 567). Lines 575 can point from the people to an icon representing the physical location.

Using the above approach, the usability and aesthetic appeal of a user interface for location based services is improved. Linkages between virtual objects in an overlay section and physical objects may be used to display the location of the virtual object even when the physical object is not visible. Additionally, because the user is able to control the display of the UE 101 by moving the UE 101, fewer actions are needed by the user to view locations and points of interest not visible. Even though the locations and points of interest are not in view, the relation in space can still be the same.

The processes described herein for providing an augmented reality user interface may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
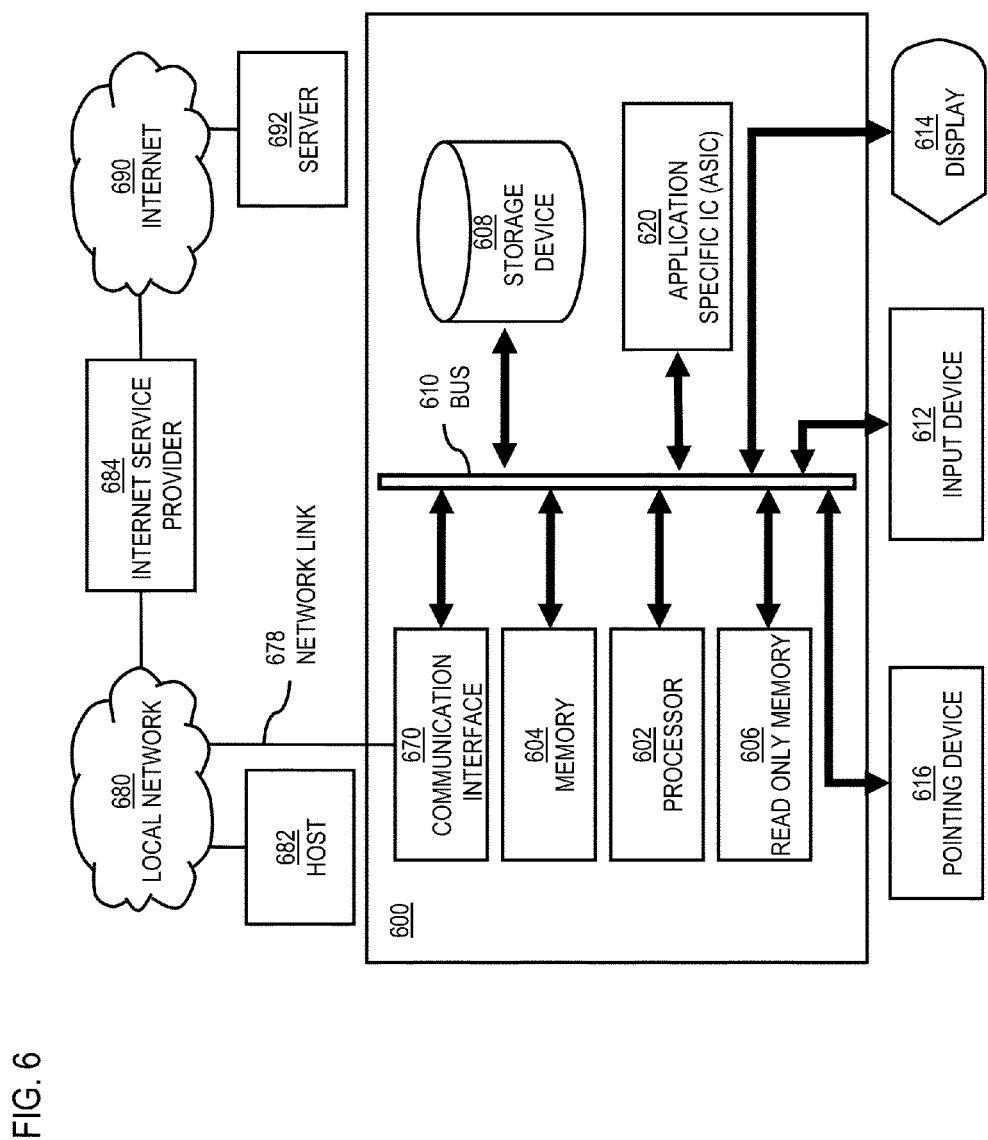
FIG. 6 is a diagram of hardware that can be used to implement an embodiment of the invention.

FIG. 6 illustrates a computer system 600 upon which an embodiment of the invention may be implemented. Computer system 600 is programmed (e.g., via computer program code or instructions) to provide an augmented reality user interface as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing an augmented reality user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for an augmented reality user interface. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for an augmented reality user interface, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing an augmented reality user interface to the UE 101.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server host 692 connected to the Internet hosts a process that provides a service in response to information received over the Internet. For example, server host 692 hosts a process that provides information representing video data for presentation at display 614.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
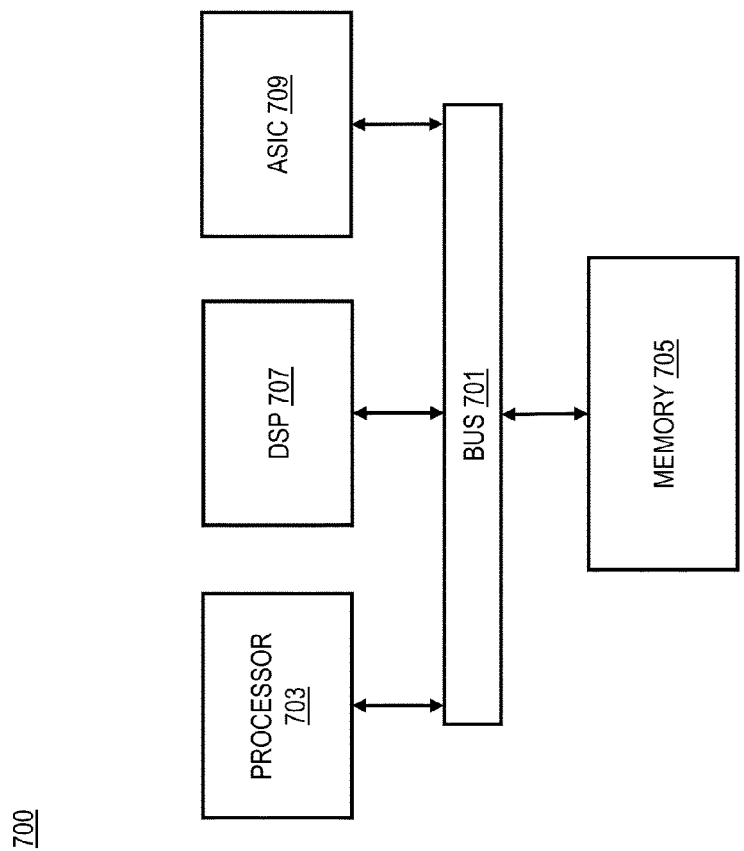
FIG. 7 is a diagram of a chip set that can be used to implement an embodiment of the invention.

FIG. 7 illustrates a chip set 700 upon which an embodiment of the invention may be implemented. Chip set 700 is programmed to provide an augmented reality user interface as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide an augmented reality user interface. The memory 705 also stores the data associated with or generated by the execution of the inventive steps.

Figure 8:
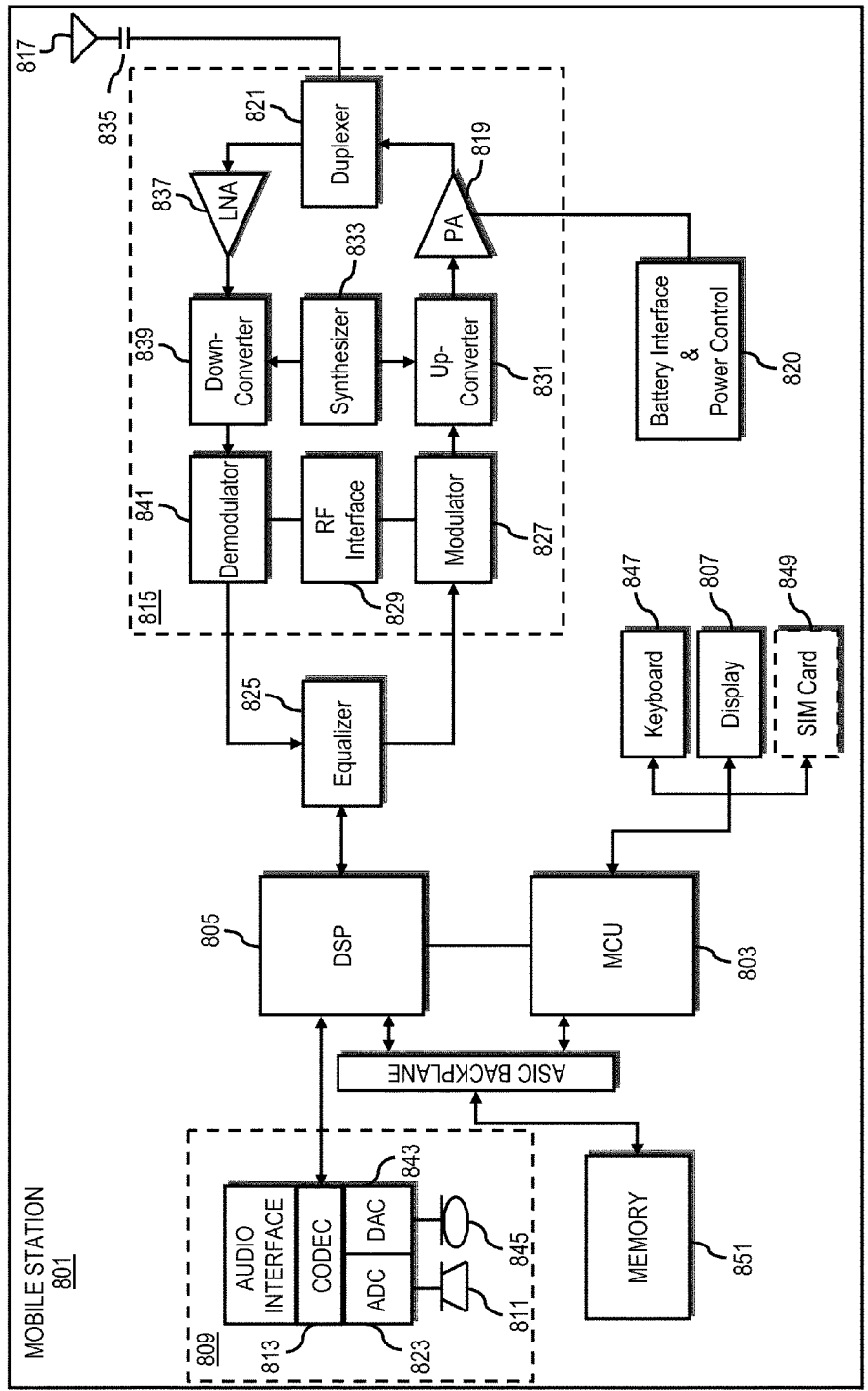
FIG. 8 is a diagram of a mobile station (e.g., handset) that can be used to implement an embodiment of the invention.

FIG. 8 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims.

As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to provide an augmented reality user interface. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
receiving an image representing a physical environment;
determining data relating to a horizon within the physical environment;

determining a section of the image to overlay location information with a boundary of the section defined based, at least in part, on the horizon; and causing, at least in part, a presenting of the location information within the determined section to a user equipment.

2. A method of claim 1, wherein the horizon data comprises data retrieved from an accelerometer sensor, a compass sensor, a gyroscope, an altimeter, or a combination thereof.

3. A method of claim 1, the method further comprising:
receiving the image from an image sensor, and wherein the horizon data is retrieved by processing the image.

4. A method of claim 1, further comprising:
determining structural information relating to the image; and
determining another section of the image comprising structures to overlay the structural information based on the horizon data.

5. A method of claim 1, wherein the location information comprises a map, an icon representing a point of interest, or a combination thereof.

6. A method of claim 1, wherein the location information comprises a map and wherein the map represents a virtual reflection of an area surrounding the physical environment.

7. A method of claim 1, wherein the boundary of the section is defined based on outlines of structures within the image above the horizon.

8. An apparatus comprising:
at least one processor; and
at least one memory including computer program code, the at least one memory and the computer program code configured to, with the at least one processor, cause the apparatus to perform at least the following,
receive an image representing a physical environment,
determine data relating to a horizon within the physical environment,
determine a section of the image to overlay location information with a boundary of the section defined based, at least in part, on the horizon, and
cause, at least in part, a presenting of the location information within the determined section to a user equipment.

9. An apparatus of claim 8, wherein the horizon data comprises data retrieved from an accelerometer sensor, a compass sensor, a gyroscope, an altimeter, or a combination thereof.

10. An apparatus of claim 8, wherein the apparatus is further caused to:
receive the image from an image sensor, and wherein the horizon data is retrieved by processing the image.

11. An apparatus of claim 8, wherein the apparatus is further caused to:
determine structural information relating to the image; and
determine another section of the image comprising structures to overlay the structural information based on the horizon data.

12. An apparatus of claim 8, wherein the location information comprises a map, an icon representing a point of interest, or a combination thereof.

13. An apparatus of claim 8, wherein the location information comprises a map and wherein the map represents a virtual reflection of an area surrounding the physical environment.

14. An apparatus of claim 8, wherein the boundary of the section is defined based on outlines of structures within the image above the horizon.

15. A non-transitory computer-readable storage medium carrying one or more sequences of one or more instructions which, when executed by one or more processors, cause an apparatus to perform at least the following:
receive an image representing a physical environment,
determine data relating to a horizon within the physical environment,
determine a section of the image to overlay location information with a boundary of the section defined based, at least in part, on the horizon, and
cause, at least in part, a presenting of the location information within the determined section to a user equipment.

16. A non-transitory computer-readable storage medium of claim 15, wherein the horizon data comprises data retrieved from an accelerometer sensor, a compass sensor, a gyroscope, an altimeter, or a combination thereof.

17. A non-transitory computer-readable storage medium of claim 15, wherein the apparatus is further caused to:
receive the image from an image sensor, and wherein the horizon data is retrieved by processing the image.

18. A non-transitory computer-readable storage medium of claim 15, wherein the apparatus is further caused to:
determine structural information relating to the image; and
determine another section of the image comprising structures to overlay the structural information based on the horizon data.

19. A non-transitory computer-readable storage medium of claim 15, wherein the location information comprises a map, an icon representing a point of interest, or a combination thereof.

20. A non-transitory computer-readable storage medium of claim 15, wherein the boundary of the section is defined based on outlines of structures within the image above the horizon.

* * * * *